(12) United States Patent
Hong et al.

(10) Patent No.: US 9,478,783 B2
(45) Date of Patent: Oct. 25, 2016

(54) RECHARGEABLE LITHIUM BATTERY AND A METHOD OF MAKING A RECHARGEABLE LITHIUM BATTERY

(71) Applicant: Samsung SDI Co., Ltd., Yongin-si, Gyeonggi-do (KR)

(72) Inventors: Chong-Gi Hong, Yongin-si (KR); Joon-Hyung Lee, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 174 days.

(21) Appl. No.: 14/051,302

(22) Filed: Oct. 10, 2013

(65) Prior Publication Data

US 2014/0154552 A1 Jun. 5, 2014

Related U.S. Application Data

(60) Provisional application No. 61/733,820, filed on Dec. 5, 2012.

(51) Int. Cl.

| H01M 4/136 | (2010.01) |
|---|---|
| H01M 2/16 | (2006.01) |
| H01M 4/58 | (2010.01) |
| H01M 10/052 | (2010.01) |

(52) U.S. Cl.
CPC ......... *H01M 2/1686* (2013.01); *H01M 2/1646* (2013.01); *H01M 2/1653* (2013.01); *H01M 4/5825* (2013.01); *H01M 10/052* (2013.01); *Y10T 29/49115* (2015.01)

(58) Field of Classification Search
None
See application file for complete search history.

(56) References Cited

U.S. PATENT DOCUMENTS

| 2008/0020283 A1* | 1/2008 | Miyashiro et al. ........... 429/322 |
| 2008/0131778 A1 | 6/2008 | Watanabe et al. |
| 2010/0068612 A1* | 3/2010 | Nishikawa ................... 429/129 |
| 2011/0293990 A1 | 12/2011 | Ryu et al. |

FOREIGN PATENT DOCUMENTS

| JP | 2007-273443 | * 10/2007 | ............. H01M 2/16 |
| JP | 2008-226463 | * 9/2008 | ............ Y02E 60/122 |
| KR | 10-2008-0003729 A | 1/2008 | |

(Continued)

OTHER PUBLICATIONS

Maachine translation of JP 2007-273443, published Oct. 2007.*

(Continued)

*Primary Examiner* — Cynthia K Walls
(74) *Attorney, Agent, or Firm* — Knobbe Martens Olson & Bear LLP

(57) ABSTRACT

Provided is a rechargeable lithium battery that includes a positive electrode including a positive active material; a negative electrode including a negative active material; a separator interposed between the positive electrode and the negative electrode; and an electrolyte solution, wherein the positive active material includes lithium metal oxide and a compound represented by the following Chemical Formula 1 and coated on a surface of the lithium metal oxide, and the separator includes a porous substrate and a coating layer including ceramic and disposed on at least one side of the porous substrate.

$$Li_{1+x}Al_xM_{2-x}(PO_4)_3 \quad \text{[Chemical Formula 1]}$$

In Chemical Formula 1, M is at least one metal selected from Ti, Cr, Ga, Fe, Sc, In, Y, Mg, and Si, and $0 < x \leq 0.7$.

15 Claims, 6 Drawing Sheets

(56) References Cited

FOREIGN PATENT DOCUMENTS

| | | |
|---|---|---|
| KR | 10-2010-0004025 A | 1/2010 |
| KR | 10-2011-0130923 A | 12/2011 |
| WO | WO 2006/018921 A1 | 2/2006 |

OTHER PUBLICATIONS

Machine translation of JP 2008-226463, retrieved from <https://dossier1.j-platpat.inpit.go.jp/tri/all/odse/ODSE_GM101_Top.action> on Feb. 29, 2016.*

* cited by examiner

RECHARGEABLE LITHIUM BATTERY AND A METHOD OF MAKING A RECHARGEABLE LITHIUM BATTERY

CROSS-REFERENCE TO RELATED APPLICATIONS

This application claims priority under 35 U.S.C. §119(e) to U.S. Provisional Application No. 61/733,820 filed Dec. 5, 2012, which is hereby incorporated by reference in its entirety.

BACKGROUND

1. Field

This disclosure relates to a rechargeable lithium battery and a method of making a rechargeable lithium battery.

2. Description of the Related Technology

There has been a need to develop rechargeable lithium batteries for the portable electronic equipment having both high performance and large capacity.

Rechargeable lithium batteries are manufactured by injecting an electrolyte solution into a battery cell, which includes a positive electrode including a positive active material capable of intercalating/deintercalating lithium ions and a negative electrode including a negative active material capable of intercalating/deintercalating lithium ions.

The positive active material may be an oxide including lithium and transition elements and having a structure being capable of intercalating lithium ions such as $LiCoO_2$, $LiMn_2O_4$, $LiNi_{1-x}Co_xO_2$ (0<x<1), and the like. A rechargeable lithium battery including such a positive active material has limits in terms of performance of a rechargeable lithium battery due to a side reaction with an electrolyte solution.

SUMMARY

One embodiment provides a rechargeable lithium battery being capable of operating at a high voltage and having improved high temperature cycle-life characteristics and thickness expansion characteristics at a high temperature.

Another embodiment provides a method of making the rechargeable lithium battery.

According to one embodiment, provided is a rechargeable lithium battery that includes a positive electrode including a positive active material; a negative electrode including a negative active material; a separator interposed between the positive electrode and the negative electrode; and an electrolyte solution, wherein the positive active material includes lithium metal oxide, and a compound represented by the following Chemical Formula 1 and coated on a surface of the lithium metal oxide, and the separator includes a porous substrate and a coating layer including ceramic and disposed on at least one side of the porous substrate.

[Chemical Formula 1]

In Chemical Formula 1, M is at least one metal selected from Ti, Cr, Ga, Fe, Sc, In, Y, Mg, and Si, and 0<x≤0.7.

The coating layer may be formed on one side or both sides of the porous substrate.

The lithium metal oxide may be oxide including lithium and at least one metal selected from cobalt, manganese, nickel, and aluminum.

In Chemical Formula 1, M may be Ti.

The compound represented by Chemical Formula 1 may be $Li_{1+x}Al_xTi_{2-x}(PO_4)_3$ and 0.1<x≤0.5.

The compound represented by Chemical Formula 1 may be coated on the lithium metal oxide.

The compound represented by Chemical Formula 1 may be formed non-continuously on the lithium metal oxide.

The compound represented by the above Chemical Formula 1 may be included in an amount of 1 to 3 wt % based on the total amount of the positive active material.

The porous substrate may include a polyolefin resin.

The ceramic may include $Al_2O_3$, MgO, $TiO_2$, $Al(OH)_3$, $Mg(OH)_2$, $Ti(OH)_4$, or a combination thereof.

The coating layer may have a thickness of 1 to 10 μm.

The coating layer may have a porosity of 30 to 55 volume %.

The coating layer may further include a heat-resistance resin selected from an aramid resin, a polyamideimide resin, a polyimide resin, or a combination thereof.

The rechargeable lithium battery may be operated at a voltage of greater than or equal to 4.3V.

According to another embodiment, provided is a method of making a rechargeable lithium battery comprising: mixing a Li raw material, an Al raw material, an M raw material and a $PO_4$ raw material in a predetermined ratio to prepare a first product; heating the first product to obtain a second product; pulverizing the second product to obtain a third product; heating the third product to obtain a fourth product; pulverizing the fourth product to obtain a fifth product; precipitating the fifth product to obtain a sixth product; mixing the sixth product with a lithium metal oxide to obtain a seventh product; and heating the seventh product to obtain a positive active material; coating the positive active material on a positive collector preparing a positive electrode; providing a separator comprising a porous substrate and a coating layer comprising a ceramic material disposed on at least one side of the porous substrate; combining a negative electrode with the positive electrode and the separator, wherein the separator is disposed between the positive electrode and the negative electrode, and wherein M is at least one selected from Ti, Cr, Ga, Fe, Sc, In, Y, Mg, and Si.

The mixing may comprise ball milling.

Other embodiments are described in the detailed description.

The rechargeable lithium battery may be capable of operating at a high voltage, and may have improved high temperature cycle-life characteristics and thickness expansion characteristics at a high temperature.

DETAILED DESCRIPTION

Example embodiments of the present disclosure will hereinafter be described in detail. However, these embodiments are only examples, but this disclosure is not limited thereto.

Figure 1:
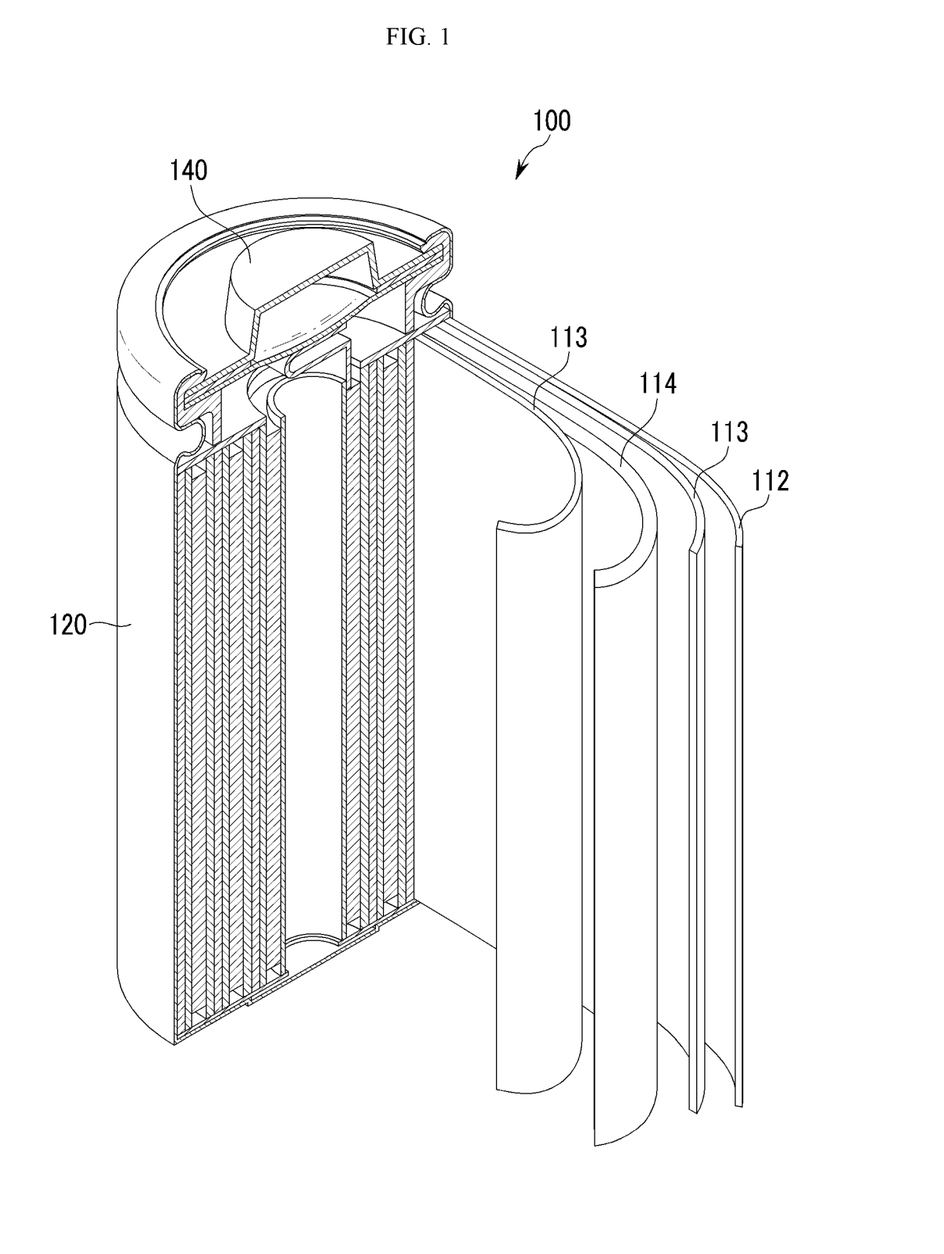
FIG. 1 is a schematic view showing a rechargeable lithium battery according to one embodiment.

A rechargeable lithium battery according to one embodiment is described referring to FIG. 1.

FIG. 1 is a schematic view showing a rechargeable lithium battery according to one embodiment.

Referring to FIG. 1, a rechargeable lithium battery 100 according to one embodiment includes an electrode assembly including a positive electrode 114, a negative electrode 112 facing the positive electrode 114, a separator 113 disposed between the positive electrode 114 and negative electrode 112, and an electrolyte solution (not shown) impregnating the positive electrode 114, negative electrode 112, and separator 113, a battery case 120 including the electrode assembly, and a sealing member 140 sealing the battery case 120.

The positive electrode includes a positive current collector and a positive active material composition layer disposed on the positive current collector.

The positive current collector may be aluminum but is not limited thereto.

The positive active material composition layer includes a positive active material.

The positive active material according to one embodiment may include a compound (a lithiated intercalation compound) that may reversibly intercalate or deintercalate lithium, for example, lithium metal oxide, and a compound represented by the following Chemical Formula 1 coated on the surface of the lithium metal oxide.

$$Li_{1+x}Al_xM_{2-x}(PO_4)_3 \quad \text{[Chemical Formula 1]}$$

In Chemical Formula 1, M is at least one metal selected from Ti, Cr, Ga, Fe, Sc, In, Y, Mg, and Si, and $0 < x \leq 0.7$.

The compound represented by the above Chemical Formula 1 has high conductivity of lithium ions and an electrical conductivity close to 0. The lithium metal oxide is coated with the compound represented by the above Chemical Formula 1 on the surface thereof, for example, protected by the compound represented by the above Chemical Formula 1 and thus, may suppress a side reaction with an electrolyte solution at a high temperature and a high voltage. Accordingly, the rechargeable lithium battery may be capable of operating at a high voltage, and has improved cycle-life and thickness expansion characteristics at a high temperature.

The lithium metal oxide may be an oxide including lithium and at least one metal selected from cobalt, manganese, nickel, and aluminum. In some embodiments, the compounds represented by the following chemical formulae may be used.

$Li_aA_{1-b}X_bD_2$ ($0.90 \leq a \leq 1.8$, $0 \leq b \leq 0.5$); $Li_aA_{1-b}X_bO_{2-c}D_c$ ($0.90 \leq a \leq 1.8$, $0 \leq b \leq 0.5$, $0 \leq c \leq 0.05$); $Li_aE_{1-b}X_bO_{2-c}D_c$ ($0.90 \leq a \leq 1.8$, $0 \leq b \leq 0.5$, $0 \leq c \leq 0.05$); $LiaE_{2-b}X_bO_{4-c}D$ ($0.90 \leq a \leq 1.8$, $0 \leq b \leq 0.5$, $0 \leq c \leq 0.05$); $Li_aNi_{1-b-c}Co_bX_cD_\alpha$ ($0.90 \leq a \leq 1.8$, $0 \leq b \leq 0.5$, $0 \leq c \leq 0.05$, $0 < \alpha \leq 2$); $Li_aNi_{1-b-c}Co_bX_cO_{2-\alpha}T_\alpha$ ($0.90 \leq a \leq 1.8$, $0 \leq b \leq 0.5$, $0 \leq c \leq 0.05$, $0 < \alpha \leq 2$); $Li_aNi_{1-b-c}Co_bX_cO_{2-\alpha}T_2$ ($0.90 \leq a \leq 1.8$, $0 \leq b \leq 0.5$, $0 \leq c \leq 0.05$, $0 < \alpha \leq 2$); $Li_aNi_{1-b-c}Mn_bX_cD_\alpha$ ($0.90 \leq a \leq 1.8$, $0 \leq b \leq 0.5$, $0 \leq c \leq 0.05$, $0 < \alpha \leq 2$); $Li_aNi_{1-b-c}Mn_bX_cO_{2-\alpha}T_\alpha$ ($0.90 \leq a \leq 1.8$, $0 \leq b \leq 0.5$, $0 \leq c \leq 0.05$, $0 < \alpha \leq 2$); $Li_aNi_{1-b-c}Mn_bX_cO_{2-\alpha}T_2$ ($0.90 \leq a \leq 1.8$, $0 \leq b \leq 0.5$, $0 \leq c \leq 0.05$, $0 < \alpha \leq 2$); $Li_aNi_bE_cG_dO_2$ ($0.90 \leq a \leq 1.8$, $0 \leq b \leq 0.9$, $0 \leq c \leq 0.5$, $0.001 \leq d \leq 0.1$); $Li_aNi_bCo_cMn_dG_eO_2$ ($0.90 \leq a \leq 1.8$, $0 \leq b \leq 0.9$, $0 \leq c \leq 0.5$, $0 \leq d \leq 0.5$, $0.001 \leq e \leq 0.1$); $Li_aNiG_bO_2$ ($0.90 \leq a \leq 1.8$, $0.001 \leq b \leq 0.1$); $Li_aCoG_bO_2$ ($0.90 \leq a \leq 1.8$, $0.001 \leq b \leq 0.1$); $Li_aMn_{1-b}G_bO_2$ ($0.90 \leq a \leq 1.8$, $0.001 \leq b \leq 0.1$); $Li_aMn_2G_bO_4$ ($0.90 \leq a \leq 1.8$, $0.001 \leq b \leq 0.1$); $Li_aMn_{1-g}G_gPO_4$ ($0.90 \leq a \leq 1.8$, $0 \leq g \leq 0.5$); $QO_2$; $QS_2$; $LiQS_2$; $V_2O_5$; $LiV_2O_5$; $LiZO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$.

In the above chemical formulae, A is selected from the group consisting of Ni, Co, Mn, and a combination thereof; X is selected from the group consisting of Al, Ni, Co, Mn, Cr, Fe, Mg, Sr, V, a rare earth element, and a combination thereof; D is selected from the group consisting of O, F, S, P, and a combination thereof; E is selected from the group consisting of Co, Mn, and a combination thereof; T is selected from the group consisting of F, S, P, and a combination thereof; G is selected from the group consisting of Al, Cr, Mn, Fe, Mg, La, Ce, Sr, V, and a combination thereof; Q is selected from the group consisting of Ti, Mo, Mn, and a combination thereof; Z is Cr, V, Fe, Sc, Y, and a combination thereof; J is selected from the group consisting of V, Cr, Mn, Co, Ni, Cu, and a combination thereof.

In the compound represented by the above Chemical Formula 1, M may be Ti among the metals. When the M is Ti, the compound may have high ion conductivity and low electrical conductivity and be coated on the surface of the lithium metal oxide.

In addition, when x in the above Chemical Formula 1 is in a range of $0 < x \leq 0.7$, an optimal electrochemical performance may be accomplished.

The compound represented by the above Chemical Formula 1 may be coated on the surface of the lithium metal oxide in an amount of 1 to 3 wt % and for example, 1.5 to 2.5 wt % based on the total amount of the positive active material. When the compound is coated within the range, a rechargeable lithium battery using the positive active material may have secure maximum discharge capacity.

The compound represented by the above Chemical Formula 1 may be coated as a layer or as an island on the surface of the lithium metal oxide. The island coating denotes that the compound incontinuously exists on the surface of the lithium metal oxide.

The positive active material is prepared as follows.

The positive active material is prepared by mixing a Li raw material, an Al raw material, an M raw material and in some embodiments, a Ti raw material, and a PO₄ raw material in a predetermined ratio to prepare a first product (S1); primarily heating the first product to obtain a second product (S2); primarily pulverizing the second product to obtain the third product (S3); secondarily heating the third product to obtain the fourth product (S4); secondarily pulverizing the fourth product to obtain a fifth product (S5); precipitating the fifth product to obtain a sixth product (S6); mixing the sixth product and a lithium metal oxide to obtain a seventh product (S7); and thirdly heating the seventh product to obtain an eighth product (S8).

Examples of the Li raw material may include $Li_2CO_3$, $LiNO_3$, $Li_3PO_4$, and the like. Examples of the Al raw material may include $Al_2O_3$, $AlPO_4$, $Al(NO_3)_3$, and the like. Examples of the Ti raw material may include $TiO_2$, $TiP_2O_7$, and the like. Examples of the PO₄ raw material may include $(NH_4)_2HPO_4$, $NH_4H_2PO_4$, $(NH_4)_2HPO_4$, $Li_3PO_4$, and the like.

The mixing in the S1 step may be performed through ball-milling. The ball milling may be performed by using a ball such as a zirconia ball and the like. The ball may have a size ranging from 0.3 to 10 mm. When the ball has a size within the range, the compound represented by the above Chemical Formula 1 may be uniformly coated on the surface of a lithium metal oxide. The ball milling may be performed for 4 to 48 hours. Within the time range, the compound represented by the above Chemical Formula 1 may be uniformly coated on the surface of a lithium metal oxide.

In the S2 step, the primary heating may be performed at a rate ranging from 0.5 to 2° C./min up to a temperature ranging from 650 to 800° C. When the primary heating is performed within the temperature range, the positive active material may be suppressed from a side reaction with an electrolyte solution.

In the primary pulverization of the S3 step, the compound represented by the above Chemical Formula 1 may be pulverized to have a uniform size ranging from 0.1 to 4 μm. The pulverization may be performed using a paint-shaker, a homogenizer, a PD mixer, ball milling, and the like, but the present embodiments are not limited thereto.

In the S4 step, the secondary heating may be performed at a rate ranging from 0.5 to 10° C./min. When the heating is performed within the rate range, uniform coating may be obtained. The heating may be performed up to a temperature of greater than or equal to 800° C. and for example, greater than or equal to 950° C. When the secondary heating is performed within the temperature range, the compound represented by the above Chemical Formula 1 has high crystallinity and thus, may have high ion conductivity. The secondary heating may transform the structure of the compound represented by the above Chemical Formula 1 from noncrystalline to crystalline.

The fourth product produced in the S4 step may be cooled down to 300° C. at a rate ranging from 50 to 200° C./min and then, naturally cooled down.

In the S5 step, the secondary pulverization may be performed under dry/wet conditions. The secondary pulverization may be the same as the primary pulverization.

In the S6 step, the precipitation may be performed for 6 to 8 hours.

In the S7 step, the lithium metal oxide is the same as described above. In addition, the mixing in the S7 step may be performed in a method of ball milling and the like, but the present embodiments are not limited thereto.

In the S8 step, the thirdly heating may be performed at a rate ranging from 0.5 to 10° C./min. The heating may be performed up to a temperature ranging from 600 to 950° C. When the heating is performed within the temperature range, the compound represented by the above Chemical Formula 1 may stabilize the lithium metal oxide as a core structure.

Then, the eighth product may be cooled down to 300° C. at a rate ranging from 50 to 200° C./min and then, naturally cooled down.

The positive active material composition layer may further include a binder and a conductive material other than the aforementioned positive active material.

The binder improves binding properties of the positive active material particles to each other and to a current collector. Examples of the binder include polyvinylalcohol, carboxylmethylcellulose, hydroxypropylcellulose, diacetylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material is included to improve electrode conductivity. Any electrically conductive material may be used as a conductive material unless it causes a chemical change. Examples of the conductive material include a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as polyphenylene derivative; or a mixture thereof.

The separator may include a porous substrate and a coating layer including ceramic and disposed on at least one side of the porous substrate. The coating layer including the ceramic may be positioned to face at least either one of the positive electrode and the negative electrode. Herein, the negative electrode may be protected by the coating layer on the separator and suppressed from a side reaction with an electrolyte solution, improving cycle-life and thickness expansion characteristics at a high temperature.

In addition, the coating layer including the ceramic structurally prevents the porous substrate from directly contacting with each active material layer of the positive and negative electrodes. When the porous substrate contacts with the active material layers, the active material may work as an oxidizing catalyst and thus, oxidize the porous substrate and elute metal ions, the coating layer may suppress the elution of metal ions.

Figure 2:
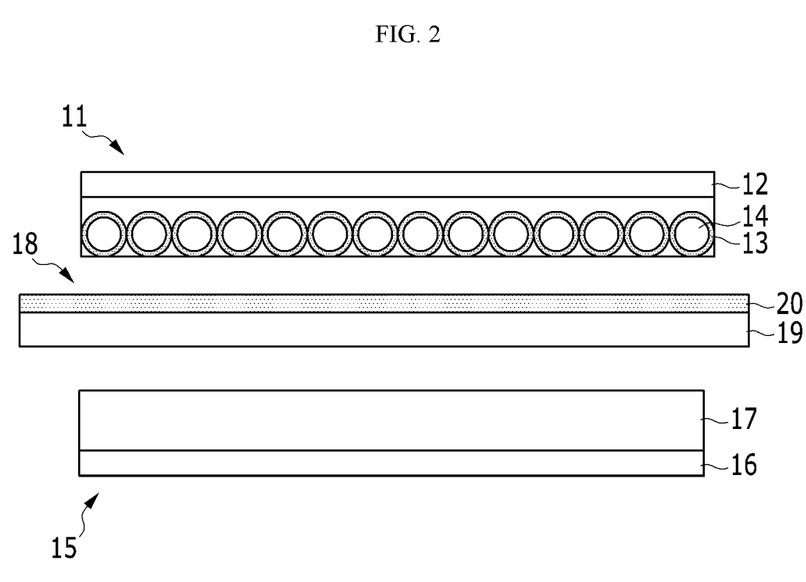
FIG. 2 is a cross-sectional view showing the structure of a rechargeable lithium battery according to one embodiment.
Figure 3:
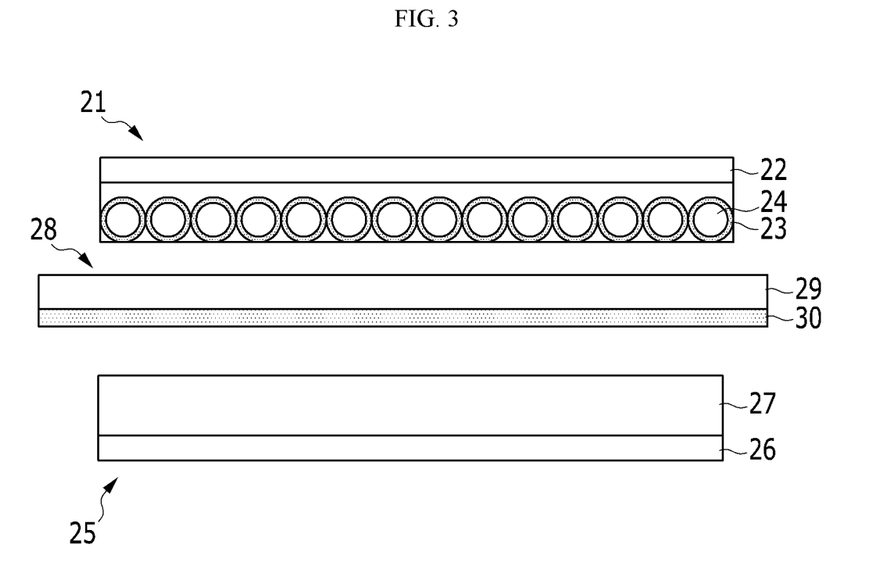
FIG. 3 is a cross-sectional view showing the structure of a rechargeable lithium battery according to another embodiment.
Figure 4:
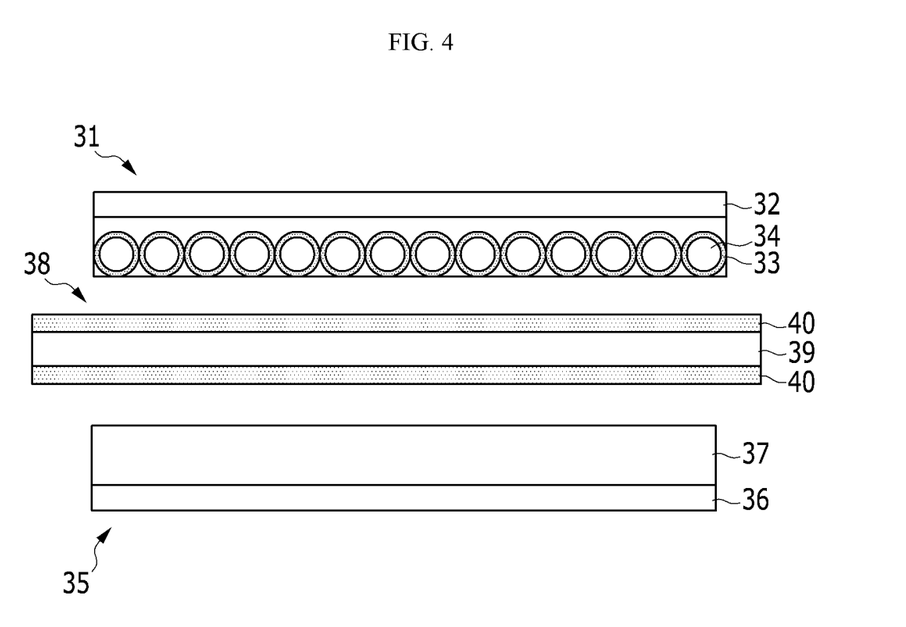
FIG. 4 is a cross-sectional view showing the structure of a rechargeable lithium battery according to yet another embodiment.

The structure of the separator in the rechargeable lithium battery is illustrated referring to FIGS. 2 to 4.

FIG. 2 is a cross-sectional view showing the structure of a rechargeable lithium battery according to one embodiment, FIG. 3 is a cross-sectional view showing a structure of a rechargeable lithium battery according to another embodiment, and FIG. 4 is a cross-sectional view showing a structure of a rechargeable lithium battery according to yet another embodiment.

Referring to FIG. 2, a rechargeable lithium battery includes a positive electrode 11 including a current collector 12 and a positive active material layer 13, a negative electrode 15 including a negative current collector 16 and a negative active material layer 17, and the a separator 18 interposed between the positive electrode 11 and the negative electrode 15. Herein, the separator 18 includes a porous substrate 19 and a coating layer 20 formed on one surface of the porous substrate 19. The coating layer 20 faces with the positive electrode 11. The positive active material layer 13 includes the aforementioned positive active material 14. As shown in FIG. 2, when the coating layer 20 formed on the separator 18 faces with the positive electrode 11, the positive electrode 11 may be double-protected from a side reaction with an electrolyte solution and the like. In other words, the lithium metal oxide may be primarily protected by the compound represented by the above Chemical Formula 1 coated on the surface thereof, and the positive electrode including the lithium metal oxide may be secondarily protected by the coating layer formed on the separator. Accordingly, the rechargeable lithium battery according to the embodiment may be operated at a high voltage and have excellent cycle-life and thickness expansion characteristics at a high temperature.

Referring to FIG. 3, a rechargeable lithium battery includes a positive electrode 21 including a positive current collector 22 and a positive active material layer 23, a negative electrode 25 including a negative current collector 26 and a negative active material layer 27, and a separator 28 interposed between the positive electrode 21 and the negative electrode 25. Herein, the separator 28 includes a porous substrate 29 and a coating layer 30 formed on one surface of the porous substrate 29. The coating layer 30 may face with the negative electrode 25. The positive active material layer 23 may include the aforementioned positive active material 24. As shown in FIG. 3, when the coating layer 30 formed on the separator 28 faces with the negative electrode 25, the lithium metal oxide in the positive electrode may be protected by the compound represented by the above Chemical Formula 1 coated on the surface thereof. In addition, the negative electrode may be protected by the coating layer formed on the separator. In other words, the positive and negative electrodes are respectively double-protected from a side reaction with an electrolyte solution and the like. Accordingly, the rechargeable lithium battery according to the embodiment may be operated at a high voltage and have excellent cycle-life and thickness expansion characteristics at a high temperature.

Referring to FIG. 4, a rechargeable lithium battery includes a positive electrode 31 including a current collector 32 and a positive active material layer 33, a negative electrode 35 including a negative current collector 36 and a negative active material layer 37, and the a separator 38 interposed between the positive electrode 31 and the negative electrode 35. Herein, the separator 38 includes a porous substrate 39 and a coating layer 40 formed on both sides of the porous substrate 39. The coating layers 40 may respectively face with the positive electrode 31 and the negative electrode 35. The positive active material layer 33 may include the aforementioned positive active material 34. As shown in FIG. 4, when the coating layers 40 formed on the separator 38 respectively face with the positive electrode 31 and the negative electrode 35, the positive electrode may not only be double-protected as shown in FIG. 2 but the negative electrode may also be double-protected as shown in FIG. 3. Accordingly, the rechargeable lithium battery according to the embodiment may be operated at a high voltage and have excellent cycle-life and thickness expansion characteristics at a high temperature.

The porous substrate included in the separator may comprise a polyolefin resin. Examples of the polyolefin resin may include a polyethylene-based resin, a polypropylene-based resin, or a combination thereof.

The ceramic may include $Al_2O_3$, MgO, $TiO_2$, $Al(OH)_3$, $Mg(OH)_2$, $Ti(OH)_4$, or a combination thereof.

The coating layer may further include a heat-resistance resin selected from an aramid resin, a polyamideimide resin, a polyimide resin, or a combination thereof as well as the ceramic.

The coating layer may have a thickness of 1 to 10 µm, and for example, 1 to 8 µm. When the coating layer has a thickness within the range, the coating layer has excellent heat resistance and may suppress thermal shrinkage and elution of metal ions.

The coating layer may have porosity of 30 to 55 volume %. When the coating layer has porosity within the range, the coating layer may more smoothly transfer ions and thus, more improve battery performance.

The negative electrode includes a negative current collector and a negative active material composition layer disposed on the negative current collector.

The negative current collector may be a copper foil.

The negative active material composition layer includes a negative active material, a binder, and an optionally a conductive material.

The negative active material includes a material that reversibly intercalates/deintercalates lithium ions, a lithium metal, a lithium metal alloy, a material being capable of doping/dedoping lithium, or a transition metal oxide.

The material that can reversibly intercalate/deintercalate lithium ions includes a carbon material. The carbon material may be any generally-used carbon-based negative active material in a rechargeable lithium battery. Examples of the carbon material include crystalline carbon, amorphous carbon, and mixtures thereof. The crystalline carbon may be non-shaped, or sheet, flake, spherical, or fiber shaped natural graphite or artificial graphite. The amorphous carbon may be a soft carbon (carbon fired at a low temperature), a hard carbon, a mesophase pitch carbonization product, fired coke, and the like.

The lithium metal alloy may include lithium and a metal selected from Na, K, Rb, Cs, Fr, Be, Mg, Ca, Sr, Si, Sb, Pb, In, Zn, Ba, Ra, Ge, Al, and Sn.

The material being capable of doping/dedoping lithium may include Si, $SiO_x$ (0<x<2), a Si—C composite, a Si-Q alloy (wherein Q is an alkali metal, an alkaline-earth metal, Group 13 to Group 16 elements, a transition element, a rare earth element or a combination thereof, and not Si), Sn, $SnO_2$, a Sn—C composite, Sn—R (wherein R is an alkali metal, an alkaline-earth metal, Group 13 to Group 16 elements, a transition element, a rare earth element, or a combination thereof, and not Sn), and the like. At least one thereof may be mixed with $SiO_2$. The Q and R may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

The transition element oxide may be vanadium oxide, lithium vanadium oxide, and the like.

The binder improves binding properties of negative active material particles with one another and with a current collector. Examples of the binder include polyvinylalcohol, carboxylmethylcellulose, hydroxypropylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material is included to improve electrode conductivity. Any electrically conductive material may be used as a conductive material unless it causes a chemical change. Examples of the conductive material include a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; or a mixture thereof.

The negative electrode may be manufactured by a method including mixing the negative active material, the binder, and the conductive material in a solvent to prepare a negative active material composition, and coating the negative active material composition on the negative current collector. The solvent may be N-methylpyrrolidone but it is not limited thereto.

The electrolyte solution may include a non-aqueous organic solvent and a lithium salt.

The non-aqueous organic solvent acts as a medium for transmitting ions taking part in the electrochemical reaction of the battery. The non-aqueous organic solvent may be selected from a carbonate-based, ester-based, ether-based, ketone-based, alcohol-based, and aprotic solvent The carbonate-based solvent may be, for example dimethyl carbonate (DMC), diethyl carbonate (DEC), dipropyl carbonate (DPC), methylpropyl carbonate (MPC), ethylpropyl carbonate (EPC), methylethyl carbonate (MEC), ethylmethyl carbonate (EMC), ethylene carbonate (EC), propylene carbonate (PC), butylene carbonate (BC), and the like.

When the carbonate-based solvent is prepared by mixing a cyclic carbonate compound and a linear carbonate compound, a solvent having a low viscosity while having an increased dielectric constant may be obtained. The cyclic carbonate compound and linear carbonate compound are mixed together at the volume ratio of about 1:1 to 1:9.

The ester-based solvent may include, for example methyl acetate, ethyl acetate, n-propyl acetate, dimethyl acetate, methyl propionate, ethyl propionate, γ-butyrolactone, decanolide, valerolactone, mevalonolactone, caprolactone, or the like. The ether-based solvent may include, for example dibutylether, tetraglyme, diglyme, dimethoxyethane, 2-methyltetrahydrofuran, tetrahydrofuran, and the like and the ketone-based solvent may include cyclohexanone, and the like. The alcohol-based compound may include ethanol, isopropyl alcohol, and the like.

The non-aqueous organic solvent may be used singularly or in a mixture. When the organic solvent is used in a mixture, the mixture ratio can be controlled in accordance with a desirable battery performance.

The non-aqueous electrolyte solution may further include an overcharge inhibition additive such as ethylenecarbonate, pyrocarbonate, and the like.

The lithium salt is dissolved in the non-aqueous solvent and supplies lithium ions in a rechargeable lithium battery, and basically operates the rechargeable lithium battery and improves lithium ion transfer between positive and negative electrodes.

The lithium salt may include $LiPF_6$, $LiBF_4$, $LiSbF_6$, $LiAsF_6$, $LiN(SO_3C_2F_5)_2$, $LiN(CF_3SO_2)_2$, $LiC_4F_9SO_3$, $LiClO_4$, $LiAlO_2$, $LiAlCl_4$, $LiN(C_xF_{2x+1}SO_2)(C_yF_{2y+1}SO_2)$, where x and y are natural numbers, LiCl, LiI, and LiB$(C_2O_4)_2$ (lithium bis(oxalato) borate, LiBOB), or a combination thereof.

The concentration of the lithium salt may range from about 0.1 M to about 2.0 M

When the lithium salt is included at the above concentration range, a concentration of a lithium ion dissociated in a non-aqueous organic solvent is higher to increase conductivity, which improves excellent cycle-life at a high voltage.

According to one embodiment, a rechargeable lithium battery uses a positive active material prepared by coating the compound represented by the above Chemical Formula 1 on the surface of the lithium metal oxide and simultaneously, a separator including a porous substrate and a coating layer including ceramic on at least one surface of the porous substrate and thus, may double-protect the positive electrode or both of the positive and negative electrodes from a side reaction with an electrolyte solution. Accordingly, the rechargeable lithium battery according to the embodiment may be operated at a high voltage and have excellent cycle-life and thickness expansion characteristics at a high temperature.

Hereinafter, the embodiments are illustrated in more detail with reference to examples. However, the following examples may be described so as to explain the present embodiments but does not limit the present embodiments.

Furthermore, what is not described in this specification can be sufficiently understood by those who have knowledge in this field and will not be illustrated here.

Example 1

Preparation of Positive Active Material (1) $Li_{1.3}Al_{0.3}Ti_{1.7}(PO4)_3$ (Hereinafter, Referred to be "ATP")

In order to synthesize 10 g of ATP, 1.25 g of $Li_2CO_3$, 3.54 g of $TiO_2$, 0.399 g of $Al_2O_3$, and 10.33 g of $(NH_4)_2HPO_4$ was ball-milled and mixed with a 5 mm zirconia ball for 2 hours. The obtained mixture was heated at a rate of 1° C./min from room temperature up to 700° C., maintained at 700° C. for 2 hours, and naturally cooled down. The cooled product was ball-milled with a 5 mm zirconia ball for 19 to 24 hours. The ball-milled product was heated up to 920° C. at a rate of 1° C./min, maintained at the 920° C. for 8 hours, cooled down to 300° C. at a rate of 150° C./min, and then, naturally cooled down.

The twice heated $Li_{1.3}Al_{0.3}Ti_{1.7}(PO_4)_3$ was ball-milled with a 5 mm zirconia ball for 48 to 72 hours under ethanol.

(2) $LiCoO_2$ Coated with ATP

The ball-milled ATP was precipitated under ethanol for 7 hours. Then, $LiCoO_2$ was added to the precipitated ATP. The ATP and the $LiCoO_2$ were ball-milled with a 5 mm zirconia ball under ethanol for 24 hours. The ball-milled product was heated up to 700° C. at a rate of 1° C./min, maintained at 700° C. for 2.5 hours, and cooled down to 300° C. at a rate of 15° C./min and then, naturally cooled down, preparing $LiCoO_2$ coated with ATP on the surface. Herein, the ATP was coated in an amount of 1 wt % on the surface of the $LiCoO_2$ based on the total amount of the $LiCoO_2$.

Fabrication of Positive Electrode

A positive active material composition was prepared by adding 94 wt % of the $LiCoO_2$ coated with the ATP as a positive active material, 3 wt % of carbonblack as a conductive material, and 3 wt % of polyvinylidenefluoride as a binder in an N-methylpyrrolidone (NMP) solvent. The positive active material composition was coated on an aluminum (Al) thin membrane, dried, and roll-pressed, fabricating a positive electrode.

Fabrication of Negative Electrode

A negative active material composition was prepared by mixing 98 wt % of graphite as a negative active material, 1 wt % of carboxylmethyl cellulose as a thickener, and 1 wt % of styrene-butadiene rubber as a binder in distilled water. The negative active material composition was coated on a copper foil, dried, and dried with a roll press, fabricating a negative electrode.

Fabrication of Separator

A separator was fabricated by mixing $Al_2O_3$ with an average particle diameter of 200 μm and an aramid resin with a weight ratio of 80:20 in an N-methylpyrrolidone solvent to prepare a coating layer composition and coating the coating layer composition on one side of a 17 μm-thick polyethylene substrate having porosity of about 40% to form a 3 μm-thick coating layer including the $Al_2O_3$ and the aramid resin. The coating layer had porosity of 72% and a pore amount of 0.72 cc/cc.

Preparation of Electrolyte Solution

An electrolyte solution was prepared by mixing ethylene carbonate, ethylmethyl carbonate, and ethyl propinonate in a volume ratio of 3:1:6 to prepare a mixed solvent and adding 1.1M of $LiPF_6$ and 0.2M of $LiN(CF_3SO_2)_2$(LiTFSi) thereto.

Fabrication of Rechargeable Lithium Battery Cell

The positive electrode, the negative electrode, the electrolyte solution, and the separator were used to fabricate a rechargeable lithium battery. Herein, the coating layer of the separator was positioned to face the negative electrode, fabricating the rechargeable lithium battery.

Example 2

A rechargeable lithium battery was fabricated according to the same method as Example 1 except for positioning the coating layer of the separator to face the positive electrode.

Example 3

A rechargeable lithium battery was fabricated according to the same method as Example 1 except for fabricating a separator by coating the coating layer composition on both sides of the polyethylene substrate to form a 6 μm-thick coating layer.

Comparative Example 1

A positive active material composition was prepared by mixing 94 wt % of $LiCoO_2$ as a positive active material, 3 wt % of carbonblack as a conductive material, and 3 wt % of polyvinylidenefluoride as a binder in an N-methylpyrrolidone (NMP) solvent. The positive active material composition was coated on an aluminum (Al) thin membrane, dried, and roll-pressed, fabricating a positive electrode.

A negative active material composition was prepared by adding 98 wt % of graphite as a negative active material, 1 wt % of carboxylmethyl cellulose as a thickener, and 1 wt % of a styrene-butadiene rubber as a binder to distilled water. The negative active material composition was coated on a copper foil, dried, and roll-pressed, fabricating a negative electrode.

In addition, an electrolyte solution was prepared by mixing ethylene carbonate, ethylmethyl carbonate, and ethyl propinonate in a volume ratio of 3:1:6 to prepare a mixed solvent and adding 1.1M of $LiPF_6$ and 0.2M of $LiN(CF_3SO_2)_2$(LiTFSi) thereto.

The positive electrode, the negative electrode, and the electrolyte solution were used with a polyethylene separator, fabricating a rechargeable lithium battery.

Comparative Example 2

A rechargeable lithium battery was fabricated according to the same method as Comparative Example 1 except for using the positive electrode according to Example 1 instead of the positive electrode according to Comparative Example 1.

Comparative Example 3

A rechargeable lithium battery was fabricated according to the same method as Comparative Example 1 except for using the separator according to Example 1 instead of the separator according to Comparative Example 1.

Evaluation 1

SEM Photograph of Positive Active Material

Figure 5:
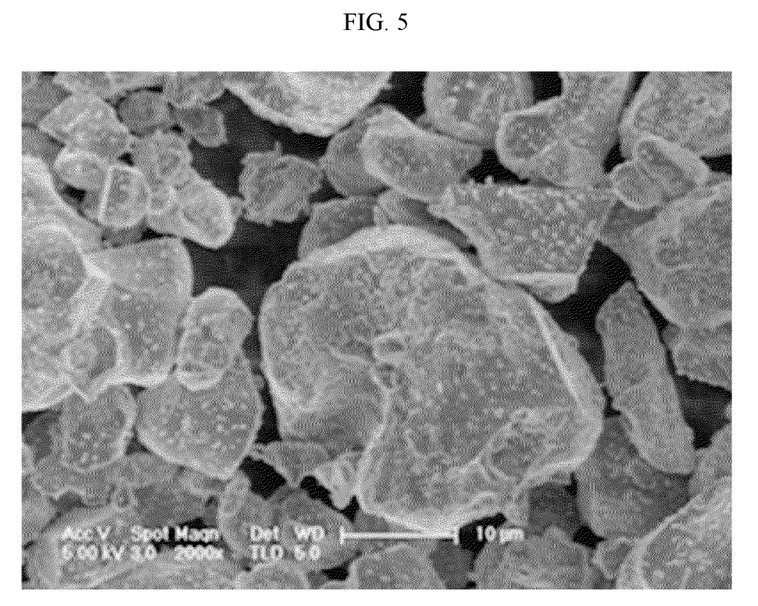
FIG. 5 is a scanning electron microscope (SEM) photograph of the positive active material used in Example 1.

FIG. 5 is a scanning electron microscope (SEM) photograph of the positive active material used in Example 1.

Referring to FIG. 5, the positive active material according to Example 1 turned out to be a lithium metal oxide coated with an ATP compound on the surface.

Evaluation 2

SEM Photograph of Separator

Figure 6:
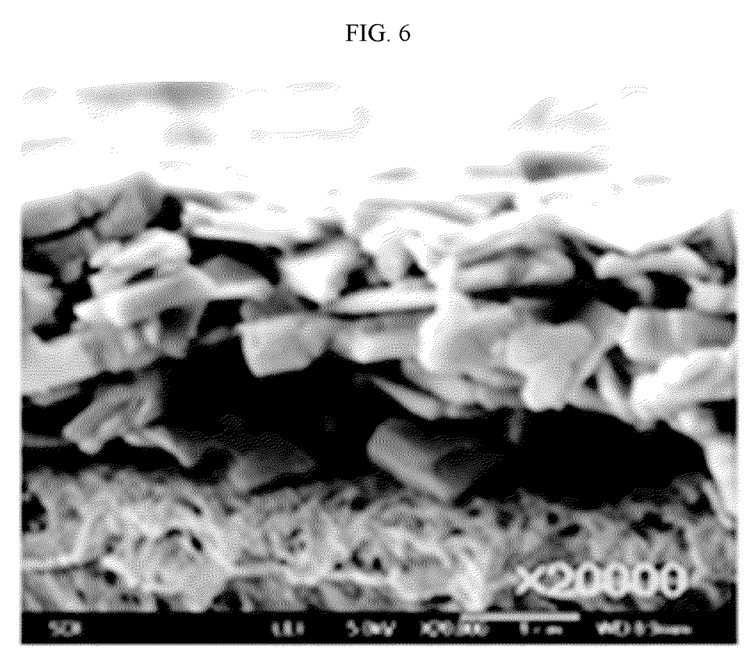
FIG. 6 is a scanning electron microscope (SEM) photograph of the cross-section of the separator according to Example 1.

FIG. 6 is a scanning electron microscope (SEM) photograph of a cross-section of the separator according to Example 1.

Referring to FIG. 6, the separator according to Example 1 turned out to include a coating layer including a ceramic on a porous substrate.

Evaluation 3

High Temperature Cycle-Life Characteristic of Rechargeable Lithium Battery

The rechargeable lithium batteries according to Examples 1 to 3 and Comparative Examples 1 to 3 were charged with 0.7C, discharged with 0.5C, and cut-off with ¹/₄₀C at 45° C. and respectively measured regarding 4.3V and 4.35V. The results are provided in the following Table 1.

In the following Table 1, capacity retention (%) is obtained as a percentage of each discharge capacity at each corresponding cycle related to initial capacity.

TABLE 1

| | Capacity retention at 4.3 V voltage (%) | | | | Capacity retention at 4.35 V voltage (%) | | | |
|---|---|---|---|---|---|---|---|---|
| | 50 cycle | 100 cycle | 150 cycle | 200 cycle | 50 cycle | 100 cycle | 150 cycle | 200 cycle |
| Example 1 | 96.30 | 94.08 | 92.43 | 90.81 | 96.50 | 94.28 | 92.63 | 91.01 |
| Example 2 | 96.13 | 93.88 | 92.23 | 90.61 | 96.23 | 94.40 | 92.43 | 90.82 |
| Example 3 | 96.70 | 94.20 | 92.83 | 91.12 | 96.91 | 94.50 | 93.13 | 91.42 |
| Comparative Example 1 | 93.15 | 90.00 | 89.01 | 87.56 | 91.65 | 88.50 | 87.41 | 86.02 |
| Comparative Example 2 | 95.32 | 92.15 | 91.12 | 89.78 | 95.52 | 92.35 | 91.35 | 90.01 |
| Comparative Example 3 | 95.17 | 92.00 | 91.11 | 89.66 | 94.87 | 91.70 | 90.91 | 89.66 |

Referring to the Table 1, the rechargeable lithium batteries using the positive active materials prepared by coating the compound represented by the above Chemical Formula 1 on the surface of the lithium metal oxide and simultaneously, the separators including the coating layer including ceramic on at least one surface of the porous substrate according to Examples 1 to 3 were operated at a high voltage and had excellent high temperature cycle-life characteristic compared with the ones according to Comparative Examples 1 to 3.

Evaluation 4

High Temperature Thickness Expansion Characteristic of Rechargeable Lithium Battery The rechargeable lithium batteries according to Examples 1 to 3 and Comparative Examples 1 to 3 were charged with 0.7C, discharged with 0.5C, and cut-off with 1/40C at 45° C. and respectively measured at 4.3V and 4.35V about temperature thickness expansion characteristics. The results are provided in the following Table 2.

In the following Table 2, a thickness variation ratio (%) is obtained according to the following equation 1.

Thickness variation ratio (%)=((thickness at a particular cycle−initial thickness)/initial thickness)× 100     [Equation 1]

TABLE 2

|  | Thickness variation ratio at 4.3 V voltage (%) | | | | Thickness variation ratio at 4.35 V voltage (%) | | | |
| --- | --- | --- | --- | --- | --- | --- | --- | --- |
|  | 50 cycle | 100 cycle | 150 cycle | 200 cycle | 50 cycle | 100 cycle | 150 cycle | 200 cycle |
| Example 1 | 2.75 | 3.08 | 3.29 | 3.41 | 2.66 | 2.84 | 3.09 | 3.33 |
| Example 2 | 2.85 | 3.28 | 3.37 | 3.61 | 2.75 | 3.18 | 3.31 | 3.58 |
| Example 3 | 2.45 | 2.68 | 2.93 | 3.12 | 2.36 | 2.51 | 2.83 | 3.08 |
| Comparative Example 1 | 5.36 | 5.91 | 6.38 | 6.51 | 6.21 | 6.75 | 7.12 | 7.31 |
| Comparative Example 2 | 3.91 | 4.26 | 4.73 | 4.88 | 3.76 | 4.06 | 4.63 | 4.78 |
| Comparative Example 3 | 4.06 | 4.41 | 4.88 | 5.03 | 4.36 | 4.71 | 5.18 | 5.33 |

Referring to Table 2, the rechargeable lithium batteries using the positive active materials prepared by coating the compound represented by the above Chemical Formula 1 on the surface of the lithium metal oxide and simultaneously, the separators including a coating layer including ceramic on at least one surface of a porous substrate had excellent thickness expansion characteristic at a high temperature compared with the ones according to Comparative Examples 1 to 3.

While the present embodiments have been described in connection with what is presently considered to be practical example embodiments, it is to be understood that the embodiments are not limited to the disclosed embodiments, but, on the contrary, is intended to cover various modifications and equivalent arrangements included within the spirit and scope of the appended claims.

What is claimed is:

1. A rechargeable lithium battery comprising:
a positive electrode comprising a positive active material;
a negative electrode comprising a negative active material;
a separator interposed between the positive electrode and the negative electrode, the separator comprising a porous substrate and a coating layer comprising a ceramic material disposed on at least one side of the porous substrate; and
an electrolyte solution,
wherein the positive active material comprises a lithium metal oxide, and a compound represented by the following Chemical Formula 1 on the surface of the lithium metal oxide:

$Li_{1+x}Al_xM_{2-x}(PO_4)_3$     Chemical Formula 1 wherein M is at least one selected from Ti, Cr, Ga, Fe, Sc, In, Y, Mg, and Si, and $0<x\leq0.7$.

2. The rechargeable lithium battery of claim 1, wherein the coating layer is formed on one side or both sides of the porous substrate.

3. The rechargeable lithium battery of claim 1, wherein the coating layer has a thickness of from about 1 μm to about 10 μm.

4. The rechargeable lithium battery of claim 1, wherein the coating layer has a porosity of from about 30 volume % to about 55 volume %.

5. The rechargeable lithium battery of claim 1, wherein the coating layer further comprises a heat-resistance resin selected from the group consisting of an aramid resin, a polyamideimide resin, a polyimide resin, or a combination thereof.

6. The rechargeable lithium battery of claim 1, wherein the porous substrate comprises a polyolefin resin.

7. The rechargeable lithium battery of claim 1, wherein the ceramic material comprises $Al_2O_3$, MgO, $TiO_2$, $Al(OH)_3$, $Mg(OH)_2$, $Ti(OH)_4$, or a combination thereof.

8. The rechargeable lithium battery of claim 1, wherein the lithium metal oxide comprises at least one of Co, Mn, Ni and Al.

9. The rechargeable lithium battery of claim 1, wherein M is Ti.

10. The rechargeable lithium battery of claim 1, wherein the compound represented by Chemical Formula 1 is $Li_{1+x}Al_xTi_{2-x}(PO_4)_3$ and $0.1<x\leq0.5$.

11. The rechargeable lithium battery of claim 1, wherein the compound represented by Chemical Formula 1 is coated on the lithium metal oxide.

12. The rechargeable lithium battery of claim 1, wherein the compound represented by Chemical Formula 1 is formed non-continuously on the lithium metal oxide.

13. The rechargeable lithium battery of claim 1, wherein the compound represented by Chemical Formula 1 is included in an amount of about 1 wt % to about 3 wt % based on the total amount of the positive active material.

14. The rechargeable lithium battery of claim 1, wherein the compound represented by Chemical Formula 1 is included in an amount of about 1.5 wt % to about 2.5 wt % based on the total amount of the positive active material.

15. The rechargeable lithium battery of claim 1, wherein the operation voltage of the rechargeable lithium battery is about 4.3V or higher.

* * * * *